United States Patent [19]

Hirose et al.

[11] Patent Number: 5,631,082
[45] Date of Patent: May 20, 1997

[54] PRESSURE-SENSITIVE ADHESIVE MATERIAL

[75] Inventors: Toshifumi Hirose; Katsuhiko Isayama, both of Kobe, Japan

[73] Assignee: Kanegafuchi Chemical Industry Co., Ltd., Osaka, Japan

[21] Appl. No.: 113,515

[22] Filed: Aug. 30, 1993

Related U.S. Application Data

[63] Continuation of Ser. No. 333,900, Apr. 6, 1989, abandoned.

[30] Foreign Application Priority Data

Apr. 7, 1988 [JP] Japan ................... 63/86585

[51] Int. Cl.$^6$ ................................................. C09J 7/02
[52] U.S. Cl. ...................... 428/343; 428/355; 428/447
[58] Field of Search ..................... 428/343, 447, 428/451, 355

[56] References Cited

U.S. PATENT DOCUMENTS

| | | | |
|---|---|---|---|
| 2,708,289 | 5/1955 | Collings | 428/428 |
| 2,789,155 | 4/1957 | Marshall | 428/349 |
| 4,172,830 | 10/1979 | Rosenberg | 428/343 |
| 4,302,262 | 11/1981 | Kay | 428/343 |
| 4,478,900 | 10/1984 | Kohno | 525/326.5 |
| 4,543,403 | 9/1985 | Isayama | 526/146 |
| 4,593,068 | 6/1986 | Hirose | 525/404 |
| 4,618,653 | 10/1986 | Kawakubo | 525/446 |
| 4,618,656 | 10/1986 | Kawakubo | 525/446 |
| 4,788,254 | 11/1988 | Kawakubo | 525/446 |
| 4,906,707 | 3/1990 | Yukimoto | 525/409 |

FOREIGN PATENT DOCUMENTS

| | | |
|---|---|---|
| 0084220 | 7/1983 | European Pat. Off. . |
| 0173303 | 3/1986 | European Pat. Off. . |
| 0213737 | 3/1987 | European Pat. Off. . |
| 0268780 | 6/1988 | European Pat. Off. . |
| 1155923 | 7/1956 | France . |
| 5978220 | 5/1984 | Japan . |
| 5978221 | 5/1984 | Japan . |
| 5978222 | 5/1984 | Japan . |
| 6004575 | 1/1985 | Japan . |
| 6023405 | 2/1985 | Japan . |
| 6032871 | 2/1985 | Japan . |
| 0191703 | 11/1985 | Japan . |
| 327938 | 7/1989 | Japan . |
| 1306935 | 2/1973 | United Kingdom . |
| 1576911 | 10/1980 | United Kingdom . |

*Primary Examiner*—Jenna Davis
*Attorney, Agent, or Firm*—Foley & Lardner

[57] ABSTRACT a tape or sheet form pressure-sensitive adhesive material which comprises a substrate which is obtainable by curing a curable resin composition comprising:

(A) an organic elastomeric polymer which is liquid at room temperature and has, in a molecule, at least one silicon-containing group to the silicon atom of which at lease one hydroxyl group or hydrolyzable group is bonded and which is cross linkable through formation of a siloxane bond, (B) a curing catalyst
and (C) optionally a tackifier resin and a pressure-sensitive adhesive layer laminated on said substrate, which has good flexibility and increased adhesive force such as adhesive strength under shear and peel strength.

18 Claims, No Drawings

PRESSURE-SENSITIVE ADHESIVE MATERIAL

This application is a continuation of U.S. application Ser. No. 07/333,900 filed Apr. 6, 1989, now abandoned.

BACKGROUND OF THE INVENTION

1. Field of the Invention

The present invention relates to a tape or sheet form pressure-sensitive adhesive material having increased adhesive force, namely adhesive strength under shear and peel strength. More particularly, the present invention relates to a pressure-sensitive adhesive tape or sheet comprising a substrate with flexibility and high tensile strength which substrate is prepared by curing a specific resin composition and a pressure-sensitive adhesive layer laminated on said substrate.

2. Description of the Related Art

There are some techniques to provide a pressure-sensitive adhesive tape or sheet with comparatively high adhesive power.

For example, it was proposed to increase the thickness of the pressure-sensitive adhesive layer on the substrate to produce the pressure-sensitive adhesive material with comparatively high adhesive power. However, the adhesive force of such pressure-sensitive adhesive material has its own limit since the thickness of the pressure-sensitive adhesive layer has its upper limit insofar as the adhesive layer is formed from a solution or emulsion type adhesive mass.

The use of a thick foam material as the substrate improves the adhesive force of the pressure-sensitive adhesive material. In case of most commonly used polyurethane or polyethylene foam, as the adhesive strength under shear is increased, the peel strength is decreased, while as the peel strength is increased, the adhesive strength under shear is decreased. Accordingly, the pressure-sensitive adhesive material comprising the foam substrate has its limit in the adhesive strength under shear, and it is very difficult to impart both comparatively high peel strength and comparatively high adhesive strength under shear to the pressure-sensitive adhesive material. Thus, none of such the foam type pressure-sensitive adhesive materials has sufficient performances.

To solve the above problems, it is proposed to produce a pressure-sensitive adhesive film containing a certain amount of bubbles of specific gas, whereby a pressure-sensitive adhesive material having both flexibility and comparatively high adhesive force is provided (cf. Japanese Patent Kokai Publication No. 125776/1983). However, this pressure-sensitive adhesive material has various drawbacks in its structure and manufacture, since it is a very special type adhesive which contains the certain amount of the bubble of specific gas and it should be produced by a method far different from the conventional methods, which method comprises whipping a composition having a pressure-sensitive adhesive property through polymerization, placing the whipped composition on the substrate and then in situ polymerizing the composition before the bubbles disappear.

It is also suggested to use minute glass balloons in place of the gas bubbles in the adhesive film (cf. Japanese Patent Kokai Publication Nos. 141346/1978 and 34976/1987). However, since the glass balloons tends to be easily broken during mixing, they should be carefully handled and processed.

SUMMARY OF THE INVENTION

One object of the present invention is to provide a tape or sheet form pressure-sensitive adhesive material with flexibility and comparatively high adhesive force.

Another object of the present invention is to provide a tape or sheet form pressure-sensitive adhesive material which can be produced easily.

Accordingly, the present invention provides a tape or sheet form pressure-sensitive adhesive material which comprises a substrate which is obtainable by curing a curable resin composition comprising:

(A) an organic elastomeric polymer which is liquid at room temperature and has, in a molecule, at least one silicon-containing group to the silicon atom of which at least one hydroxyl group or hydrolyzable group is bonded and which is cross linkable through formation of a siloxane bond (hereinafter referred to as "silicon-containing reactive group"), (B) a curing catalyst and (C) optionally a tackifier resin and a pressure-sensitive adhesive layer laminated on said substrate.

DETAILED DESCRIPTION OF THE INVENTION

The organic elastomeric polymer (A) should be elastomeric and flexible after curing.

The term "flexibile" herein used is intended to mean that not only the polymer can be bent at room temperature with a small finger force, but also the polymer has a modulus of elasticity of $1 \times 10^8$ dyne/cm$^2$ or less, preferably $5 \times 10^7$ dyne/cm$^2$ or less at room temperature.

Accordingly, the organic elastomeric polymer (A) has such properties that it is liquid at room temperature, namely it is flowable in a temperature range between about 5° C. to about 35° C. and kneadable at room temperature without the presence of a plasticizer and that it can be molded in the form of a tape or a sheet optionally in the presence of a solvent. Further, the organic elastomeric polymer (A) has at least one silicon-containing reactive group in a molecule in order that the polymer (A) is molded in the form of a tape or a sheet, and the polymer (A) should provide a rubbery material.

Insofar as the cured material of the organic polymer is elastomeric, the polymer (A) may comprise any backbone chain. Specific examples of the organic elastomeric polymer (A) are polyethers comprising repeating units of the formula: —R—O— in which R is a divalent organic group, preferably a divalent alkylene group (cf. Japanese Patent Application No. 335798/1987); polyacrylates obtainable through radical polymerization of an acrylate (e.g. 2-ethylhexyl acrylate, butyl acrylate, etc.) and acrylate base copolymers of an acrylate (e.g. 2-ethylhexyl acrylate, butyl acrylate, etc.) with vinyl acetate, acrylonitrile, methyl methacrylate, styrene and the like (cf. Japanese Patent Kokai Publication No. 168014/1984); saturated hydrocarbon base polymers such as isoprene base polymers and hydrogenated diene base polymers (cf. Japanese Patent Application Nos. 327938/1987 and 330890/1987); polyethers modified with vinyl monomers which is obtainable by polymerizing the vinyl monomers (e.g. acrylates or methacrylates having 1 to 12 carbon atoms in the alcohol residue, vinyl acetate, acrylonitrile, styrene, etc.) in the polyethers which have been prepared by polymerizing cyclic ethers (e.g. propylene oxide, ethylene oxide, tetrahydrofuran, etc.), and the like.

Among them, the polyethers containing at least 50% by weight, preferably at least 70% by weight, more preferably at least 90% by weight of the repeating units of the formula: —R—O— in which R is the same as defined, particularly polypropylene oxide are preferable.

The silicon-containing reactive group contained in the organic elastomeric polymer (A) is the well known group and can be cross linked even at room temperature.

A typical example of such group may be represented by the formula:

wherein X is a hydroxyl group or a hydrolyzable group provided that when two or more X groups are present, they may be the same or different, $R^1$ is a monovalent hydrocarbon group having 1 to 20 carbon atoms or a triorganosiloxy group of the formula:

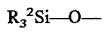

$$R_3{}^2Si-O-$$

in which $R^2$ is a monovalent hydrocarbon group having 1 to 20 carbon atoms provided that three $R^2$ groups may be the same or different and that when two or more $R^1$ groups are present, they may be the same or different, "a" is 0, 1, 2 or 3, "b" is 0, 1 or 2 provided that the sum of "a" and "mb" is at least 1, preferably from 1 to 4, and "m" is 0 or an integer of 1 to 18 provided that when "m" is not less than 2, the bracketed groups may be the same or different.

Among the silicon-containing reactive group, a group of the formula:

wherein X and $R^1$ are the same as defined above and "c" is 1, 2 or 3 is preferable.

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, the alkoxy group having 1 to 8 carbon atoms is preferable since it is mildly hydrolyzed and easily handled. One to three hydrolyzable group can be bonded to one silicon atom.

The silanol group can be formed through hydrolysis of the hydrolyzable silicon-containing group.

Specific examples of the group $R^1$ are alkyl groups (e.g. methyl, ethyl, etc.), cycloalkyl groups (e.g. cyclohexyl, etc.), aryl groups (e.g. phenyl, etc.), aralkyl groups (e.g. benzyl, etc.), alkenyl groups (e.g. vinyl), a trimethylsiloxy group and the like. $R^1$ may be a hydrocarbon group a part of the hydrogen atoms are substituted. Among them, methyl is preferable.

Preferably, the silicon-containing reactive group has at least one silicon atom. When the silicon atoms are bonded through siloxane linkages, the silicon-containing reactive group preferably has not more than 20 silicon atoms.

The silicon-containing reactive group chemically bonds to the backbone chain of the organic elastomeric polymer through the silicon-carbon bond.

The organic polymer (A) has at least one, preferably 1.2 to 6 silicon-containing reactive groups in a molecule on the average. When the number of the silicon-containing group in a molecule is less than one on the average, the curable composition is not effectively cured and the improvement of the properties is not satisfactorily achieved. When the average number of the silicon-containing reactive groups exceeds six, the cured polymer tends to lose flexibility.

When the organic elastomeric polymer (A) has one silicon-containing reactive group, preferably the silicon-containing reactive group is present at the molecular end. When the silicon-containing reactive group is present at the molecular end, an average molecular weight between the adjacent cross linked sites increases so that the cured polymer has better flexibility and larger elongation.

The silicon-containing reactive group may be introduced in the organic elastomeric polymer by such manners as disclosed in Japanese Patent Application Nos. 335798/1987 and 330890/1987 and Japanese Patent Kokai Publication No. 168014/1984. The specific manners are as follows:

(1) Copolymerizing a monomer having a copolymerizable unsaturated bond and the silicon-containing reactive group (e.g. vinyltrialkoxysilane, methacryloyloxypropylmethyldialkoxysilane, methacryloyloxypropyltrialkoxysilane and the like) with a polymerizable monomer (e.g. ethylene, propylene, isobutylene, chloroprene, isoprene, butadiene, acrylate and the like); or copolymerizing a monomer having a copolymerizable epoxy group and the silicon-containing reactive group (e.g. γ-glycidoxypropyltrimethoxysilane, γ-glycidoxypropylmethyldimethoxysilane and the like) with propyleneoxide or ethyleneoxide. By this manner, the silicon-containing reactive group is introduced in the side chain of the organic polymer.

(2) Polymerizing a radically polymerizable monomer in the presence of a mercapto or disulfide type chain transfer agent having the silicon-containing reactive group (e.g. mercaptopropyltrialkoxysilane, mercaptopropylmethyldialkoxysilane and the like).

(3) Polymerizing a radically polymerizable monomer by the use of an azo or peroxide type polymerization initiator having the silicon-containing reactive group (e.g. azo-bis-2-(6-methyldiethoxysilyl-2-cyanohexane) and the like).

By the manners (2) and (3), the silicon-containing reactive group is introduced at the chain end of the polymer molecule.

(4) Reacting a compound having a functional group Y' and the silicon-containing reactive group with a polymer having a functional group Y reactive with the functional group Y' (e.g. a hydroxyl group, a carboxyl group, a mercapto group, an epoxy group, an isocyanate group and the like) on the side chain and/or at the chain end of the molecule.

Specific examples of the reaction (4) are shown in following Table.

TABLE 1

| Functional group Y | Functional group Y' | Resulting bond |
|---|---|---|
| —COOH | HO— | —COO— |
| ↑ | CH₂——CH—<br>\ /<br>O | —COOCH₂CH—<br>              \|<br>              OH |
| ↑ | H₂N— | COO⁻H₃N⁺—<br>or<br>—CONH— |
| ↑ | OCN— | —COOCONH— |

TABLE 1-continued

| Functional group Y | Functional group Y' | Resulting bond |
|---|---|---|
| ↑ —OH | $CH_2$=CHCOO— OCN— | —COOCH$_2$CH$_2$COO— —OCONH— |
| —SH | CH$_2$——CH— \\O/ | —SCH$_2$CH— \| OH |
| ↑ ↑ ↑ ↑ | OCN— CH$_2$=CHCOO— CH$_2$=CH— ClCH$_2$— | —SCONH— —SCH$_2$CH$_2$COO— —SCH$_2$CH$_2$— —SCH$_2$— |
| —CH——CH$_2$ \\O/ | HOOC— | —CHCH$_2$OCO— \| OH |
| ↑ | HS— | —CHCH$_2$S— \| OH |
| ↑ | H$_2$N— | —CHCH$_2$NH— \| OH |
| ↑ | HO— | —CHCH$_2$O— \| OH |
| —NH$_2$ | CH$_2$——CH— \\O/ | —NHCH$_2$—CH— \| OH |
| ↑ | OCN— | —NHCONH— |
| ↑ | HOOC— | —$\overset{+}{NH_3}$O$^-$CO— or —NHCO— |
| ↑ | ClCH$_2$— | —$\overset{+}{NH_2}$CH$_2$— \| Cl$^-$ |
| ↑ —CONH$_2$ —CH=CH$_2$ ↑ | CH$_2$=CHCOO— OCN— HS— H—Si≡ | —NHCH$_2$CH$_2$COO— —CONHCONH— —CH$_2$CH$_2$S— —CH$_2$CH$_2$Si≡ |
| CH$_3$ \| —C=CH$_2$ | ↑ | CH$_3$ \| —CH$_2$CH$_2$Si≡ |
| —NCO ↑ ↑ ↑ | HOOC— HO— HS— H$_2$N— | —NHCOOCO— —NHCOO— —NHCOS— —NHCONH— |
| —CH——CH— \| \| O=C  C=O \\O/ | HO— | —CH—CH— \| \| O=C  C=O \| \| HO  O— |
| ↑ | H$_2$N— | —CH—CH— \| \| O=C  C=O \| \| HO  NH— |

Specific examples of the polymer having the functional group Y which is used as a starting material or an intermediate material are polyetherpolyols comprising repeating units of the formula: —R—O— wherein R is the same as defined above (e.g. polyoxypropylenepolyol, polyoxyethylenepolyol, polyoxytetramethylenediol and the like); polyesterpolyols prepared by polycondensation of a dibasic acid (e.g. adipic acid) and glycol or ring opening polymerization of lactons; polyols or polycarboxylic acids of polyisobutylene; polyols or polycarboxylic acids of polybutadiene or copolymers of butadiene with styrene, acrylonitrile and the like; polyols of polyolefins prepared by hydrogenating polyisoprene or polybutadiene; polymer having an isocyanate functional group prepared by reacting the above polyols or polycarboxylic acids with polyisocyanate; polymers having an ethylenically unsaturated bond prepared by reacting the above polyols with a halogen-containing ethylenically unsaturated compound, isopropenyl-terminated polyisobutylene, and the like. Among them, preferable are those having the functional group Y at the chain end of the molecule.

Specific examples of the silicon-containing compound having the functional group Y' are aminosilanes (e.g. γ-(2-aminoethyl)propyltrimethoxysilane, γ-(2-aminoethyl)-aminopropylmethyldimethoxysilane, γ-aminopropyltriethoxy-silane, etc.), mercaptosilanes (e.g. γ-mercaptopropyltrimethoxysilane, γ-mercaptopropylmethyldimethoxysilane, etc.), epoxysilanes (e.g. γ-glycidoxypropyltrimethoxysilane, β-(3,4-epoxycyclohexyl)ethyltrimethoxysilane, etc.), ethylenically unsaturated silanes (e.g. vinyltriethoxysilane, γ-methacryloyloxypropyltrimethoxysilane, γ-acryloyloxypropylmethoxysilane, etc.), chlorine-containing silanes (e.g. γ-chloropropyltrimethoxysilane, etc.), isocyanate-containing silanes (e.g. γ-isocyanatepropyltriethoxysilane, γ-isocyanatepropylmethyldimethoxysilane, etc.), and hydrosilanes (e.g. methyldimethoxysilane, trimethoxysilane, methyldiethoxysilane, etc.) and the like.

Since the organic elastomeric polymer (A) should be liquid at room temperature, preferably it has a number average molecular weight of about 500 to 50,000, more preferably about 1,000 to 20,000.

Preferable examples of the organic elastomeric polymer (A) are disclosed in Japanese Patent Publication No. 15951/1974, Japanese Patent Kokai Publication Nos. 179210/1982, 191703/1983, 78220/1984, 78221/1984, 78222/1984, 168014/1984, 23405/1985, 32871/1985, 78223/1984, 4575/1985/4576/1985, 228516/1985, 228517/1985, 34066/1986, 34067/1986 and Japanese Patent Application Nos. 335798/1987 and 330890/1987.

Any of the conventional curing catalysts which are used to cure the organic elastomeric polymer (A) may be used in the present invention. Specific examples of the curing catalyst (B) are titanates (e.g. tetrabutyl titanate, tetrapropyl titanate, etc.); tin carbonate salts (e.g. dibutyltin dilaurate, dibutyltin maleate, dibutyltin diacetate, tin octylate, tin naphthenate, etc.); organic zirconium compounds (e.g. zirconium tetraisopropoxide, zirconium tetrabutoxide, etc.); reaction products of dibutyltin oxide with phthalates, chelate compounds such as organic aluminum compounds (e.g. aluminum trisacetylacetonate, aluminum trisethylacetoacetonate, diisopropoxyaluminum ethylacetoacetonate, etc.), dibutyltin diacetylacetonate, zirconium tetraacetylacetonate, titanium tetraacetylacetonate and the like; lead octylate; amines (e.g. butylamine, monoethanolamine, triethylenetriamine, guanidine, 2-ethyl-4-methylimidazole, 1,8-diazabicyclo[5.4.0]undecene-7 (DBU), etc.) or their salts with carboxylic acids; and other acid or base catalysts which are known as silanol catalysts. Among them, the organic aluminum compounds such as aluminum trisacetylacetonate, aluminum trisethylacetoacetonate and diisopropoxyaluminum ethylacetoacetonate, the organic zirconium compounds such as zirconium tetraacetylacetonate, zirconium tetraisopropoxide and zirconium tetrabutoxide, the organic titanium compounds such as tetrabutyl titanate, tetrapropyl titanate and titanium tetraacetylacetonate, the tin (II) compounds such as tin octylate are preferable since they provides the cured material which have good releasability from a silicone releasing paper which is used as a processing paper or a separator for the substrate to be produced.

The curing catalyst is used in an amount of 0.1 to 10 parts by weight, preferably 0.5 to 8 parts by weight per 100 parts by weight of the organic elastomeric polymer (A). When the amount of the curing catalyst is less than 0.1 part by weight, the effect of the catalyst is not obtained, while it exceeds 10 parts by weight, the composition is cured too quickly so that the processability of the composition when applied onto the substrate may be deteriorated.

In the present invention, the substrate comprises the cured material prepared from the curable composition comprising the organic elastomeric polymer (A) and the curing catalyst (B). In the curable composition, the total amount of the polymer (A) and the curing catalyst (B) is usually at least 40% by weight, preferably at least 50% by weight based on the weight of the curable composition. When said total amount is less than 40% by weight, the curing property of the composition is unstable, that is, the curing rate or the physical properties of the cured material tend to vary.

In addition to the organic elastomeric polymer (A) and the curing catalyst (B), the composition may contain various additives such as tackifying resins which adjust the flexibility and increase the strength of the substrate, solvents which adjust the viscosity of the curable composition, silicon-containing compounds which are used mainly to adjust the flexibility of the substrate, fillers, plasticizers and softening agents which adjust the physical properties of the substrate, antioxidants, ultraviolet light absorbers, pigments, surfactants and the like.

The kind of the tackifying resin is not critical, and any of the conventionally used tackifying resins may be used.

Specific examples of the tackifying resin are phenol resins, modified phenol resins (e.g. cashew nut oil-modified phenol resins, tall oil-modified phenol resins, etc.), terpene phenol resins, xylene phenol resins, cyclopentadiene phenol resins, xylene resins, petroleum resins, phenol-modified petroleum resins, rosin ester resins, low molecular weight polystyrene base resins, terpene resins and the like. These may be used independently or as a mixture of two or more of them. Among them, the phenol resins and the phenol base resins are preferred since they can impart good flexibility, large elongation and large strength to the cured material. Among the phenol resins and the phenol base resins, novolak type ones are preferred, since they have low reactivity and are easily handled. In case of the novolak type phenol resins, those having a softening point of 50° to 180° C. are preferred.

The amount of the tackifying resin is 10 to 140 parts by weight, preferably 15 to 80 parts by weight per 100 parts of the organic elastomeric polymer (A). When the amount of the tackifying resin is less than 10 parts by weight, the flexibility, elongation and strength of the substrate are not sufficiently improved. When said amount is larger than 140 parts by weight, the cured material tends to have too large modulus of elasticity so that the rubbery properties of the cured material are not satisfactorily obtained.

Specific examples of the solvent are ketones (e.g. acetone, methyl ethyl ketone, etc.), esters (e.g. ethyl acetate, butyl acetate, etc.), hydrocarbons (e.g. toluene, xylene, hexane, etc.), alcohols (e.g. methanol, ethanol, etc.) and the like. The amount of the solvent is not critical and preferably selected so that the curable composition has a viscosity of 10 to 10,000 poise at room temperature, which is suitable for easy molding of the substrate.

Specific examples of the silicon-containing compound are silane coupling agents including alkylalkoxysilanes (e.g. methyltrimethoxysilane, dimethyldimethoxysilane, trimethylmethoxysilane, n-propyltrimethoxysilane, etc.), alkylisopropenoxysilanes (e.g. dimethyldiisopropenoxysilane, methyltriisopropenoxysilane, γ-glycidoxypropylmethyldiisopropenoxysilane, etc.), alkoxysilanes having functional groups (e.g. γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(γ-aminoethyl) aminopropylmethyldimethoxysilane, γ-mercaptopropyltrimethoxysilane, γ-mercaptopropylmethyldimethoxysilane, etc.); silicone varnishes; polysiloxanes; silanol compounds (e.g. trimethylsilanol, triethylsilanol, triphenylsilanol, diphenylmethylsilanol, phenyldimethylsilanol, diphenylsilanediol, etc.); hexamethyldisilazane; ethyl silicate; and the like.

Specific examples of the filler are silica flour, calcium carbonate, clay, talc, titanium oxide, zinc oxide, diatomaceous earth, barium sulfate, carbon black and the like. Among them, the silica flour, particularly one having a particle size of 7 to 50 nm (a BET specific surface area of 50 to 380 m$^2$/g) is preferred. Particularly, the hydrophobic silica flour the surfaces of which particles are treated is preferred since it greatly improves the strength of the cured material.

Specific examples of the plasticizer or the softening agent are dioctyl phthalate, butyl benzyl phthalate, polypropylene glycol, chlorinated paraffin, liquid polybutadiene and the like.

The substrate to be used according to the present invention is prepared by molding the curable composition in the form of a tape era sheet and curing the composition.

The curable composition may be a solvent type or a solvent-free type. Since the curable composition can be used as the solvent free type or the solvent type containing little solvent, when the tackifying resin or other additive is used, it may be beforehand dissolved in the solvent and the mixed with the organic elastomeric polymer (A) and the curing catalyst (B), or it may be directly mixed with the organic elastomeric polymer (A) and/or the curing catalyst (B) and then the mixture is homogeneously mixed at a temperature around the softening point of the tackifying resin and the like, or all the components are kneaded repeatedly with a kneader or a roll at a temperature around room temperature to obtain the curable composition completely free from the solvent.

The tape or sheet form substrate (hereinafter sometimes referred to as "cured sheet") with a large thickness is to be prepared, the curable composition completely free from the solvent is preferred. To adjust the viscosity, the solvent may be added in such an amount that the composition is not substantially adversely affected by the formation of bubbles during heating and curing.

Preferably, the organic elastomeric polymer (A) and the curing catalyst (B) are mixed just before the application of the composition on the silicone releasing paper.

The cured sheet is prepared by applying the curable composition on the silicone releasing paper and drying and curing the composition.

There is no limitation on the application manner of the curable composition. For example, the curable composition may be coated on the releasing paper with a coater. To defoam the bubbles trapped during mixing, the composition may be processed with a three-roll mill.

The viscosity of the curable composition depends on its composition and is usually from 10 to 10,000 poise.

The thickness of the applied curable composition is not critical. It is usually from 10 µm to 3 mm, preferably from 0.1 to 1.5 mm.

After the application, the curable composition is dried and cured at a temperature of from room temperature to 150° C. for 0.5 to 30 minutes. When formation of bubbles due to volatile components such as the solvent should be avoided, the volatile components are evaporated off from the surface at such a low temperature that the composition is not foamed, and then the curing is carried out.

The pressure-sensitive adhesive tape or sheet according to the present invention is produced by laminating the pressure-sensitive adhesive layer on the cured sheet as the substrate which is prepared in the above described manner.

Any kind of pressure-sensitive adhesive can be used according to the present invention. Exemplified are solvent type, emulsion type or solvent-free type (oligomer type or hot melt type) acrylic base copolymer type adhesives, solvent type or hot melt type adhesives which are prepared by compounding the tackifying resin in the natural or synthetic rubber, calendering type adhesives, silicone base adhesives comprising silicone rubbers and silicone varnishes, liquid type curable adhesives which are prepared by compounding the tackifying resin in polyethers or diene oligomers, and the like.

After the pressure-sensitive adhesive is applied on the substrate, it is dried and/or cured to obtain the pressure-sensitive adhesive material according to the present invention.

The pressure-sensitive adhesive layer may be formed on one side or both sides of the substrate. When the pressure-sensitive adhesive layers are formed on both sides of the substrate, the kinds of the adhesives on each side may be the same or different.

The pressure-sensitive adhesive layer may be laminated on the substrate by a conventional method. Some typical methods are as follows:

(1) The cured sheet and the pressure-sensitive adhesive layer film are separately formed, and then they are bonded each other.

(2) On the cured sheet, the pressure-sensitive adhesive is applied and then dried and cured.

(3) On the pressure-sensitive adhesive layer film, the curable composition for the substrate is applied and then dried and cured.

The thickness of the pressure-sensitive adhesive layer is not critical. It is usually from 5 µm to 1 mm, preferably from 25 to 100 µm. When the pressure-sensitive adhesive layer is too thick, the strength under shear of the pressure-sensitive adhesive material is decreased since the cohesive force of the pressure-sensitive adhesive layer is weak.

The above methods (2) and (3) are preferable, since the bond strength between the substrate and the pressure-sensitive adhesive layer is increased so that the breakage at the interface between the substrate and the pressure-sensitive adhesive layer is prevented.

The pressure-sensitive adhesive material according to the present invention has not only good flexibility such that it has modulus of elasticity of $1 \times 10^8$ dyne/cm$^2$ or less preferably $5 \times 10$ dyne/cm$^2$ but also excellent adhesive performances, namely increased peel strength and adhesive strength under shear as well as good retention thereof, while it can be produced in the same manner as the conventional pressure-sensitive adhesive material.

The pressure-sensitive adhesive material according to the present invention is preferably used to assemble or fix automobile parts (e.g. side mouldings, emblem mouldings, weather strips, air spoilers, etc.), electrical equipments, furnishings, display boards, building materials, and the like.

PREFERRED EMBODIMENTS OF THE INVENTION

The present invention will be explained further in detail by following Examples, wherein "parts" are by weight unless otherwise indicated.

EXAMPLES 1–22

A polymer consisting of propylene oxide having three dimethoxysilyl group [—Si(CH$_3$)(OCH$_3$)$_2$] per molecule on the average and an average molecular weight of 9,600 (hereinafter referred to as "Propylene oxide base polymer A"), straight type novolak phenyl resin fine powder (PR-50731 manufacture by Sumitomo Bakelite Co., Ltd.), diphenylsilanediol as the silicon-containing compound and a hindered phenol type antioxidant (Noklack NS-6 manufactured by Ohuchi Shinko Chemical Industries, Co., Ltd.) were weighed out in amounts shown in Table 2 and kneaded with a three roll paint mill. To the mixture, silica fine powder (Aerosil manufactured by Nippon Aerosil Co., Ltd.) in an amount shown in Table 2 was added. Then, the mixture was again kneaded with the three roll paint mill. To the mixture, a 50% solution of aluminum trisethylacetoacetate in toluene was added in an amount shown in Table 2. The mixture was mixed and deaerated under reduced pressure to obtain a curable polymer composition.

The prepared curable polymer composition was coated on a silicone releasing paper (EK-130R manufactured by Soken Kako Co., Ltd.) with a doctor blade to form a layer having a thickness shown in Table 2 and then heated and cured at 120° C. for 10 minutes to obtain a cured sheet to be used as the substrate of the pressure-sensitive adhesive material.

In separate steps, the pressure-sensitive adhesive film was prepared as follows:

A commercially available solvent type acrylic adhesive (SK Dain NP-225 manufactured by Soken Chemical Co., Ltd.) was coated on a silicone releasing paper (EK-130R) to form a film having a thickness of 50 µm after drying and dried and cured at 80° C. for 2 minutes.

Two pressure-sensitive adhesive films were laminated on both side of the cured sheet with preventing formation of air bubbles therebetween to produce a double coated adhesive tape.

The adhesion characteristics of the produced adhesive tape were measured as follows:

180 degree peel strength

To one surface of the double coated adhesive tape, a sheet of aluminum foil with a thickness of 0.1 mm (JIS H4000, A1050P) was adhered and cut to the width of 2.5 cm. Then, the aluminum foil-lined adhesive tape was adhered to a stainless steel plate the surface of which had been polished with a No. 280 abrasive paper and kept standing at room temperature for one day. Then, 180 degree peel strength of the sample was measured at a pulling of 300 mm/min. at 23° C. or 70° C. with an autograph (manufactured by Shimadzu).

Adhesive strength under shear

End parts of about 3.2 cm$^2$ of a pair of aluminum plates each having a thickness of 2 mm, a width of 2.5 cm and a length of 8 cm (JIS H4000, A1050P) were adhered with the double coated adhesive tape and kept standing at room temperature for one day. Then, the adhesive strength under shear was measured at a pulling rate of 300 mm/min. at 23° C. or 70° C. with the autograph (manufactured by Shimadzu).

Holding power

To one surface of the double coated adhesive tape, a sheet of aluminum foil with a thickness of 0.1 mm (JIS H4000, A1050P) was adhered and cut to the width of 2.5 cm. Then, the end part with an area of 6.25 cm² of the aluminum foil-lined adhesive tape was adhered to an end part of stainless steel plate the surface of which had been polished with a No. 280 abrasive paper and kept standing at room temperature for one day. Then, the sample was subjected to the shearing stress test with loading a weight of 1 kg at the other end of the adhesive tape at 70° C. for 7 days. When the weight fell, the time (hours) till the weight fell was measured. When the weight did not fall, the length of dislocation (mm) was measured.

The results are shown in Table 2.

COMPARATIVE EXAMPLE 1

On a silicone releasing paper (EK-130R), an acrylic adhesive (SK Dain NP-225) was coated to a thickness of 50 μm after drying and kept standing at room temperature to remove a solvent followed by drying and curing at 80° C. for 2 minutes. Then, the prepared adhesive tape was subjected to the same tests as in Example 1 but it was not laminated on the cured sheet. The results are shown in Table 2.

COMPARATIVE EXAMPLE 2

In the same manner as in Comparative Example 1 but coating the acrylic adhesive to a thickness of 100 μm after drying, the same procedures were repeated to measure the adhesion characteristics. The results are also shown in Table 2.

TABLE 2

| Example No. | 1 | 2 | 3 | 4 | 5 | 6 | 7 | 8 | 9 | 10 | 11 |
|---|---|---|---|---|---|---|---|---|---|---|---|
| Composition of cured sheet (parts) | | | | | | | | | | | |
| Propyleneoxide base polymer A | 100 | 100 | 100 | 100 | 100 | 100 | 100 | 100 | 100 | 100 | 100 |
| Phenol resin (PR-50731) | 35 | 65 | 80 | 50 | 50 | 20 | 35 | 50 | 65 | 80 | 20 |
| Solution of aluminum trisethylacetoacetate | 10 | 10 | 10 | 10 | 10 | 10 | 10 | 10 | 10 | 10 | 10 |
| Diphenylsilanediol | — | — | — | — | 3 | 3 | 3 | 3 | 3 | 3 | 3 |
| Noklack NS-6 | 1 | 1 | 1 | 1 | 1 | 1 | 1 | 1 | 1 | 1 | 1 |
| Aerosil R972 (hydrophobic) | — | — | — | 5 | — | 10 | 10 | 10 | 10 | 10 | — |
| Aerosil 130 | — | — | — | — | — | — | — | — | — | — | 10 |
| Thickness of cured sheet (mm) | 0.62 | 0.58 | 0.66 | 0.65 | 0.64 | 0.61 | 0.73 | 0.73 | 0.61 | 0.61 | 0.58 |
| Adhesion characteristics*[1] 180 degree peel strength (kg/cm) | | | | | | | | | | | |
| at 23° C. | 2.6 | 4.0 | 4.2 | 2.2 | 4.8 | 3.6 | 3.6 | 3.8 | 4.4 | 4.0 | 3.1 |
|  | (100) | (100) | (100) | (50) | (100) | (0) | (0) | (80) | (0) | (100) | (0) |
| at 70° C. | 1.0 | 1.0 | 1.0 | 1.5 | 1.4 | 2.2 | 2.6 | 1.6 | 2.0 | 1.8 | 2.4 |
|  | (100) | (100) | 100 | (50) | (100) | (0) | (0) | (80) | (0) | (100) | (0) |
| Adhesion strength under shear (kg/cm²) | | | | | | | | | | | |
| at 23° C. | 7.5 | 11.8 | 12.3 | 7.6 | 7.6 | 13.3 | 10.3 | 7.3 | 13.5 | 12.5 | 7.6 |
|  | (0) | (0) | (0) | (0) | (0) | (0) | (0) | (0) | (0) | (0) | (0) |
| at 70° C. | 3.2 | 5.1 | 4.0 | 3.0 | 2.7 | 5.4 | 6.0 | 3.7 | 5.6 | 6.2 | 5.1 |
|  | (70) | (0) | (0) | (90) | 100) | (0) | (0) | (0) | (0) | (0) | (0) |
| Holding power at 70° C. | 3.5 mm | 4.5 hr | 4.1 hr | 84 hr | 5.5 hr | 2.6 mm | 3.2 mm | 4.5 mm | 10.5 hr | 7.5 hr | 4.3 mm |

| Example No. | 12 | 13 | 14 | 15 | 16 | 17 | 18 | 19 | 20 | 21 | 22 |
|---|---|---|---|---|---|---|---|---|---|---|---|
| Composition of cured sheet (parts) | | | | | | | | | | | |
| Propyleneoxide base polymer A | 100 | 100 | 100 | 100 | 100 | 100 | 100 | 100 | 100 | 100 | 100 |
| Phenol resin (PR-50731) | 20 | 50 | 20 | 35 | 35 | 35 | 35 | 35 | — | — | — |
| Solution of aluminum trisethylacetoacetate | 10 | 10 | 10 | 10 | 10 | 10 | 10 | 10 | 10 | 10 | 10 |
| Diphenylsilanediol | 3 | 3 | 5 | 5 | 5 | 3 | 3 | 3 | — | 5 | 5 |
| Noklack NS-6 | 1 | 1 | 1 | 1 | 1 | 1 | 1 | 1 | 1 | 1 | 1 |
| Aerosil R972 (hydrophobic) | 15 | 15 | 10 | 15 | 15 | 15 | 15 | 15 | — | 10 | 15 |
| Aerosil 130 | — | — | — | — | — | — | — | — | — | — | — |
| Thickness of cured sheet (mm) | 0.59 | 0.59 | 0.65 | 0.60 | 0.30 | 0.62 | 0.81 | 1.14 | 0.54 | 0.68 | 0.54 |
| Adhesion characteristics*[1] 180 degree peel strength (kg/cm) | | | | | | | | | | | |
| at 23° C. | 3.4 | 3.2 | 3.6 | 4.7 | 4.0 | 3.0 | 3.4 | 3.1 | 2.1 | 2.7 | 2.8 |
|  | (0) | (0) | (50) | (0) | (0) | (0) | (0) | (0) | (0) | (0) | (0) |
| at 70° C. | 2.2 | 2.6 | 1.4 | 2.5 | 2.0 | 2.1 | 2.2 | 2.5 | 1.1 | 1.0 | 1.0 |
|  | (0) | (0) | (100) | (50) | (0) | (0) | (0) | (0) | (0) | (0) | (0) |

TABLE 2-continued

| Adhesion strength under shear (kg/cm²) | | | | | | | | | | | |
|---|---|---|---|---|---|---|---|---|---|---|---|
| at 23° C. | 12.3 (0) | 11.2 (0) | 6.7 (0) | 10.1 (0) | 12.1 (0) | 10.7 (0) | 9.3 (0) | 8.6 (0) | 6.3 (0) | 9.2 (0) | 7.8 (0) |
| at 70° C. | 6.7 (0) | 5.6 (0) | 5.2 (0) | 4.9 (100) | 4.9 (50) | 4.9 (0) | 4.6 (100) | 3.4 (100) | 2.3 (0) | 3.9 (0) | 4.1 (0) |
| Holding power at 70° C. | 2.1 mm | 4.6 mm | 2.1 mm | 3.4 mm | 3.2 mm | 3.5 mm | 4.2 mm | 6.4 mm | 2.1 mm | 2.3 mm | 1.7 mm |

| | | |
|---|---|---|
| Comparative Example No. | 1 | 2 |
| Composition of cured sheet (parts) | | |
| Propyleneoxide base polymer A | — | — |
| Phenol resin (PR-50731) | — | — |
| Solution of aluminum trisethylacetoacetate | — | — |
| Diphenylsilanediol | — | — |
| Noklack NS-6 | — | — |
| Aerosil R972 (hydrophobic) | — | — |
| Aerosil 130 | — | — |
| Thickness of cured sheet (mm) | — | — |
| Adhesion characteristics*¹⁾ | | |
| 180 degree peel strength (kg/cm) | | |
| at 23° C. | 1.9 | 3.0 |
| at 70° C. | 1.0 | 2.4 |
| Adhesion strength under shear (kg/cm²) | | |
| at 23° C. | 3.8 | 3.9 |
| at 70° C. | 0.9 | 1.3 |
| Holding power at 70° C. | 2.1 mm | 4.1 hr |

Note:
*[1] The value in the brackets is the percentage of the samples which were broken at the interface between the cured sheet and the pressure-sensitive adhesive layer.

EXAMPLES 23 AND 24

On a silicone releasing paper (EK-130R), an acrylic adhesive (SK Dain NP-225) was coated to a thickness of 50 µm after drying and dried and cured at 80° C. for 2 minutes. On the acrylic adhesive layer, the curable composition prepared in Example 7 or 15 was coated with a doctor blade having a wide width and heated and cured at 120° C. for 10 minutes to obtain an adhesive sheet having the laminated adhesive layer on one side.

On the other side of the adhesive sheet, the pressure-sensitive adhesive film which was prepared in the same manner as in Examples 1–22 was laminated with preventing the formation of air bubbles to produce a double coated adhesive tape. Then, the adhesion characteristics of the adhesive tape were measured in the same manners as in Example 1. The results are shown in Table 3.

EXAMPLES 25 AND 26

On the other side of the adhesive sheet having the pressure-sensitive adhesive layer on the one side which was prepared in Example 23 or 24, the acrylic adhesive (SK Dain NP-225) coated to a thickness of 50 µm and dried at 80° C. for 2 minutes to obtain an adhesive sheet having the pressure-sensitive adhesive layers on both sides. Then, the adhesion characteristics of the adhesive tape were measured in the same manners as in Example 1. The results are shown in Table 3.

TABLE 3

| Example No. | 23 | 24 | 25 | 26 |
|---|---|---|---|---|
| Composition of cured sheet | Exam. 7 | Exam. 15 | Exam. 7 | Exam. 15 |
| Thickness of cured sheet (mm) | 0.62 | 0.61 | 0.59 | 0.59 |
| Adhesion characteristics | | | | |
| 180 degree peel strength (kg/cm) | | | | |
| at 23° C. | 4.5 (0) | 4.2 (0) | 4.3 (0) | 4.3 (0) |
| Adhesion strength under shear | | | | |
| at 70° C. | 13.3 (0) | 13.0 (0) | 12.5 (0) | 12.6 (0) |
| Holding power at 70° C. | 3.4 mm | 3.1 mm | 4.2 mm | 3.9 mm |

What is claimed is:

1. A tape or sheet form pressure-sensitive adhesive material which comprises a substrate which is obtained by curing a curable resin composition comprising:
   (A) an organic elastomeric polymer which is liquid at room temperature and has, in a molecule, at least one silicon-containing group to the silicon atom of which at least one hydroxyl group or hydrolyzable group is bonded and which is cross linkable through formation of a siloxane bond,
   (B) a curing catalyst and
   (C) optionally a tackifier resin
   and a pressure-sensitive adhesive layer comprising an acrylic adhesive laminated on said substrate.

2. A tape or sheet form pressure-sensitive adhesive material according to claim 1, wherein the organic elastomeric polymer (A) comprises, as a backbone chain, a polyether comprising repeating units of the formula:

—R—O— in which R is a divalent organic group.

3. A tape or sheet form pressure-sensitive adhesive material according to claim 2, wherein the polyether contains a least 50% by weight of the repeating units —R—O—.

4. A tape or sheet form pressure sensitive adhesive material according to claim 3, wherein the polyether is polypropylene oxide.

5. A tape or sheet form pressure-sensitive adhesive material according to claim 1, wherein the silicon-containing group is a group of the formula:

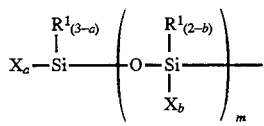  (I)

wherein X is a hydroxyl or a hydrolyzable group, provided that when two or more X groups are present, they may be the same or different; $R^1$ is a monovalent hydrocarbon group having 1 to 20 carbon atoms or a triorganosiloxy group of the formula:

$R_3^2Si—O—$ in which $R^2$ is a monovalent hydrocarbon group having 1 to 20 carbon atoms, provided that the three $R^2$ groups may be the same or different and that when two or more $R^1$ groups are present, they may be the same or different; a is 0, 1, 2 or 3; b is 0, 1 or 2; m is 0 or an integer of 1 to 18, provided that the sum of a and mb is at least 1; and provided that when m is two or more, the

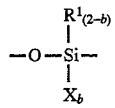

groups may be the same or different.

6. A tape or sheet form pressure-sensitive adhesive material according to claim 5, wherein the silicon-containing group is the group of the formula:

  (I)

wherein c is 1, 2 or 3.

7. A tape or sheet form pressure-sensitive adhesive material according to claim 1, wherein the hydrolyzable group is selected from the group consisting of a hydrogen atom, a halogen atom, an alkoxyl group, an acyloxy group, a ketoximate group, an amino group, an amide group, an aminoxy group, a mercapto group, and an alkenyloxy group.

8. A tape or sheet form pressure-sensitive adhesive material according to claim 7, wherein the hydrolyzable group is an alkoxy group having 1 to 8 carbon atoms.

9. A tape or sheet form pressure-sensitive adhesive material according to claim 2, wherein R is a divalent alkylene group.

10. A tape or sheet form pressure-sensitive adhesive material according to claim 3, wherein the polyether contains at least 70% by weight of the repeating units —R—O—.

11. A tape or sheet form pressure-sensitive adhesive material according to claim 3, wherein the polyether contains at least 90% by weight of the repeating units —R—O—.

12. A tape or sheet form pressure-sensitive adhesive material according to claim 1, wherein polymer (A) has a number average molecular weight of about 500 to 50,000 and after curing has a modulus of elasticity of $1\times10^8$ dyne/cm$^2$ or less.

13. A tape or sheet form pressure-sensitive adhesive material according to claim 1, wherein the curing catalyst (B) is used in an amount of 0.1 to 10 parts by weight per 100 parts by weight of the organic elastomeric polymer (A) and the tackifier resin (C) is used in an amount of 10 to 140 parts by weight per 100 parts of the organic elastomeric polymer (A).

14. A tape or sheet form pressure-sensitive adhesive material according to claim 1, wherein a pressure-sensitive adhesive layer is laminated on both sides of the substrate.

15. A tape or sheet form pressure-sensitive adhesive material according to claim 1, wherein the pressure-sensitive adhesive layer has a thickness of from 5 micrometers to 1 millimeter and the thickness of the substrate is 10 micrometers to 3 millimeters.

16. A tape or sheet form pressure-sensitive adhesive material according to claim 1, wherein the curable resin composition further comprises one or more of a silicon-containing compound, a solvent, plasticizer, or a filler.

17. A tape or sheet form pressure-sensitive adhesive material which comprises a substrate which is obtained by curing a curable resin composition comprising:

(A) an organic elastomeric polymer which is liquid at room temperature and has, in a molecule, at least one silicon-containing group to the silicon atom of which at least one hydroxyl group or hydrolyzable group is bonded and which is cross linkable through formation of a siloxane bond, wherein the organic elastomeric polymer (A) comprises, as a backbone chain, a polyether comprising repeating units of the formula:

—R—O— in which R is a divalent polypropylene oxide organic group, and wherein the silicon-containing group is the group of the formula:

  (I)

wherein X is a hydroxyl or a hydrolyzable group, provided that when two or more X groups are present, they may be the same or different; $R^1$ is a monovalent hydrocarbon group having 1 to 20 carbon atoms or a triorganosiloxy group of the formula:

$R_3^2Si—O—$ in which $R^2$ is a monovalent hydrocarbon group having 1 to 20 carbon atoms, provided that the three $R^2$ groups may be the same or different and that when two or more $R^1$ groups are present, they may be the same or different; wherein X and $R^1$ are the same as defined above and "c" is 1, 2 or 3.

(B) a curing catalyst and (C) optionally a tackifier resin and a pressure-sensitive adhesive layer comprising an acrylic adhesive laminated on said substrate.

18. A tape or sheet form pressure-sensitive adhesive material according to claim 17, wherein a pressure-sensitive adhesive layer is laminated on both sides of the substrate.

* * * * *